(12) United States Patent
Too et al.

(10) Patent No.: US 7,379,762 B2
(45) Date of Patent: May 27, 2008

(54) PORTABLE DIGITAL DEVICE ORIENTATION

(75) Inventors: Yew Teng Too, Woodlands (SG); chun Teck Lim, Tampines (SG)

(73) Assignee: Creative Technology Ltd., Singapore (SG)

(*) Notice: Subject to any disclaimer, the term of this patent is extended or adjusted under 35 U.S.C. 154(b) by 173 days.

(21) Appl. No.: 10/655,959

(22) Filed: Sep. 4, 2003

(65) Prior Publication Data

US 2005/0054392 A1    Mar. 10, 2005

(51) Int. Cl.
*H04Q 7/20*    (2006.01)

(52) U.S. Cl. .................................. 455/575.1; 455/90.3

(58) Field of Classification Search ............. 455/575.1, 455/414.1, 414.4, 575.4, 575.8, 575.3, 90.3, 455/566, 550.1, 556.1, 556.2, 347, 348, 344, 455/128; 379/428.01, 433.01; 345/168, 345/169, 158, 156; 341/22; 400/89; 708/142
See application file for complete search history.

(56) References Cited

U.S. PATENT DOCUMENTS

| | | | |
|---|---|---|---|
| 5,432,720 A | | 7/1995 | Lucente et al. |
| 5,661,632 A | | 8/1997 | Register |
| 5,825,675 A | * | 10/1998 | Want et al. ................. 708/142 |
| 5,914,481 A | | 6/1999 | Danielson et al. |
| 6,016,135 A | | 1/2000 | Biss et al. |
| 6,091,675 A | * | 7/2000 | Lee ......................... 369/30.36 |
| 6,593,914 B1 | | 7/2003 | Nuovo et al. |
| 6,851,552 B1 | * | 2/2005 | Chao ............................. 206/5 |
| 6,862,739 B1 | * | 3/2005 | Hunter et al. ............... 720/653 |
| 2003/0184593 A1 | * | 10/2003 | Dunlop ....................... 345/810 |

FOREIGN PATENT DOCUMENTS

| | | |
|---|---|---|
| EP | 0 766 168 A2 | 9/1996 |
| EP | 0 766 168 A3 | 9/1996 |
| EP | 0 998 102 A2 | 10/1999 |
| EP | 0 998 102 A3 | 10/1999 |
| EP | 1 263 193 A2 | 5/2002 |
| EP | 1 263 193 A3 | 5/2002 |
| WO | WO 00/79772 A1 | 12/2000 |

OTHER PUBLICATIONS

PCT Search Report, International Application No. PCT/SG2004/000275, International Filing Date, Aug. 31, 2004, mailing date Nov. 4, 2004 (3 pp.).

* cited by examiner

*Primary Examiner*—Jean Gelin
(74) *Attorney, Agent, or Firm*—Blakley, Sokoloff, Taylor & Zafman; Stephen M. De Klerk

(57) ABSTRACT

A portable digital device having at least two control devices for controlling at least two operating functions of the portable digital device; a digital display for displaying information; and a processor. The processor is for rotating the information from a right-handed orientation to a left-handed orientation and vice versa, and remapping the at least two control devices to reverse their operating functions to allow for use of the portable digital device in both the first orientation and the second orientation. Upon remapping skip forward and skip back operating functions are interchanged, increase volume and decrease volume operating functions are interchanged; and menu move to the left and right operating functions are interchanged.

10 Claims, 6 Drawing Sheets

| Table 1 |
|---|
| R1,C1 = Skip Forward |
| R1,C2 = Skip Backward |
| R2,C1 = Volume Up |
| R2,C2 = Volume Down |

| Table 2 |
|---|
| R1,C1 = Skip Backward |
| R1,C2 = Skip Forward |
| R2,C1 = Volume Down |
| R2,C2 = Volume Up |

PORTABLE DIGITAL DEVICE ORIENTATION

FIELD OF THE INVENTION

The present invention relates to portable digital device orientation and refers particularly, though not exclusively, to the orientation of functional aspects of portable digital devices to allow for right-handed and left-handed use. The functional aspects may include displays and/or controls.

BACKGROUND TO THE INVENTION

There have been many proposals for orientation of displays of digital devices. These are normally for larger devices having many functional input controls such as, for example, notebook computers, tablet computers, personal digital assistants, and mobile telephones.

For portable digital devices, particularly small or handheld portable digital devices such as, for example, CD players, MP3 players, and the like, digital displays have been able to be physically removed and rotated through 180° to allow for right-handed or left-handed use. However, this is a difficult and time-consuming process. It also does not change the controls to allow for easier use. Therefore, those who use such devices with their left hand may find it awkward due to the controls being set-up for right-handed use.

SUMMARY OF THE INVENTION

In accordance with a first aspect of the invention there is provided a portable digital device having at least two control devices for controlling at least two operating functions of the portable digital device; a digital display for displaying information; and a processor. The processor is for rotating the displayed information from a first orientation to a second orientation as a single entity, and remapping the at least two control devices to reverse their operating functions. This allows for use of the portable digital device in both the first orientation and the second orientation.

In a further aspect, the present invention provides a method for reorienting a portable digital device from a first orientation to a second orientation, the method including the steps of: rotating information for display on a digital display of a portable digital device from a first rotation position to a second rotation position, the rotation of the information displayed being as a single entity; and remapping at least two operating functions of at least two control devices of the portable digital device from at least one operating function to at least one other operating function.

For both aspects, upon remapping, the skip forwards and skip back operating functions may be interchanged; the increase volume and decrease volume operating functions may be interchanged; and the menu display move left and right operating functions may be interchanged. The first orientation may be for right-hand use of the portable digital device; and the second orientation may be for left-hand use of the portable digital device. The rotation may be 180°. The at least two operating functions may be skip forwards, skip back, increase volume and decrease volume. The information may be as a bit map so rotation of the information does not change the information layout on the digital display.

There may be further included a memory containing a key map, a first table corresponding to the first orientation, and a second table corresponding to the second orientation.

BRIEF DESCRIPTION OF THE DRAWINGS

In order that the invention may be fully understood and readily put into practical effect, there shall now be described by way of non-limitative example only preferred embodiments of the present invention, the description being with reference to the accompanying illustrative drawings in which.

DETAILED DESCRIPTION OF PREFERRED EMBODIMENT

Figure 1:
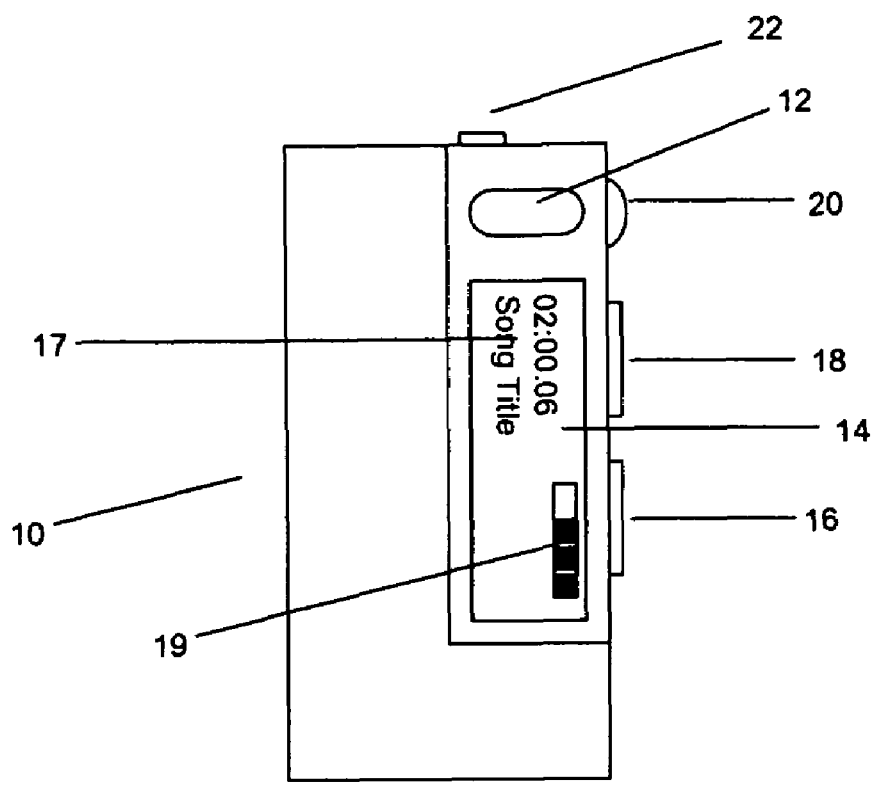
FIG. 1 is a perspective view of a first embodiment of a portable digital device.
Figure 2:
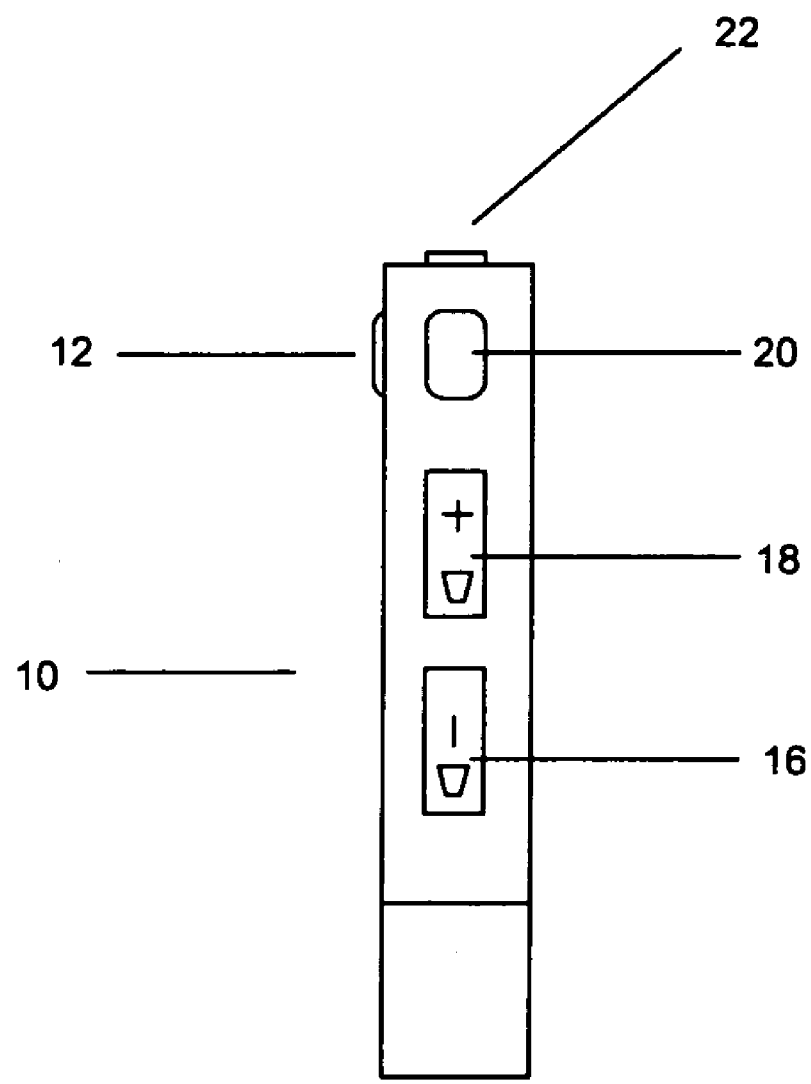
FIG. 2 is a side view of the first embodiment.

To first refer to FIGS. 1 to 4, there is shown a portable digital device 10 such as that disclosed in our earlier U.S. patent application Ser. No. 10/100,351 filed 18 Mar. 2002 for "Memory Module With Audio Playback Mode", the contents of which are hereby incorporated by reference.

The device 10 includes a play/pause button 12 for initiating playback, and pausing playback. It may also be used to stop playback, and to be an on/off switch. A digital display 14 is also provided. It may be, for example, a liquid crystal display ("LCD"). Device 10 also has a volume up button 16, a volume down button 18, and a menu control knob 20. Knob 20 may be spring loaded to a central position and is able to be rotated anticlockwise and clockwise to move a cursor to the right and to the left across a menu page displayed across display 14; and may be depressed for selection of menu pages, and icons representing various functions within each menu page. It may also be used for track skipping both forwards and reverse.

Device 10 also has an earphone/headphone socket 22, and an in-built microphone 24.

Figure 3:
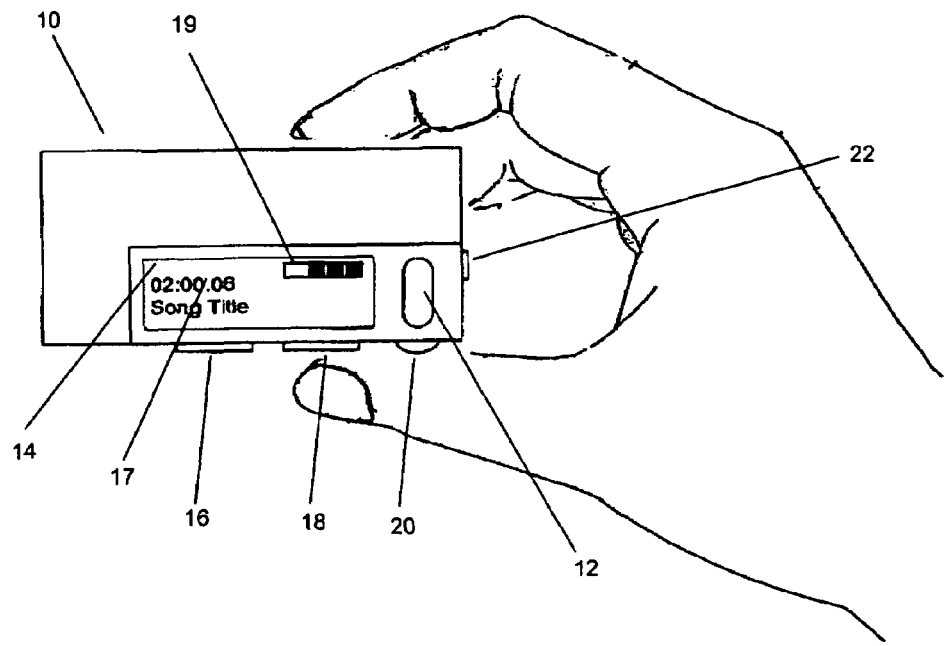
FIG. 3 is a perspective view of the first embodiment in a first orientation.

As is shown in FIG. 3, the display 14 has data displayed oriented so that the display 14 is to be read by a person using control aspects of buttons 16 and 18 and knob 20 using their right hand. This would be the normal situation for a right-handed user.

Figure 4:
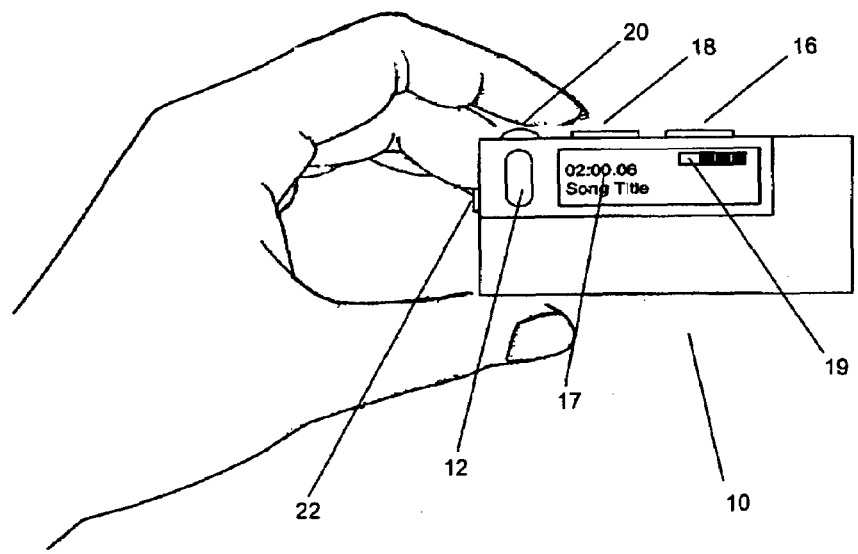
FIG. 4 is a perspective view of the first embodiment in a second orientation.

FIG. 4 shows the device 10 with the display 14 having the data displayed reversed as if the device 10 is being used by the left hand of a person, the normal situation where the user is left-handed. The data displayed is displayed as a bit map. By rotation of the bit map 180°, the display is "flipped" for left-hand use. This reverse process is used to rotate displayed data from left hand to right hand use.

Figure 5:
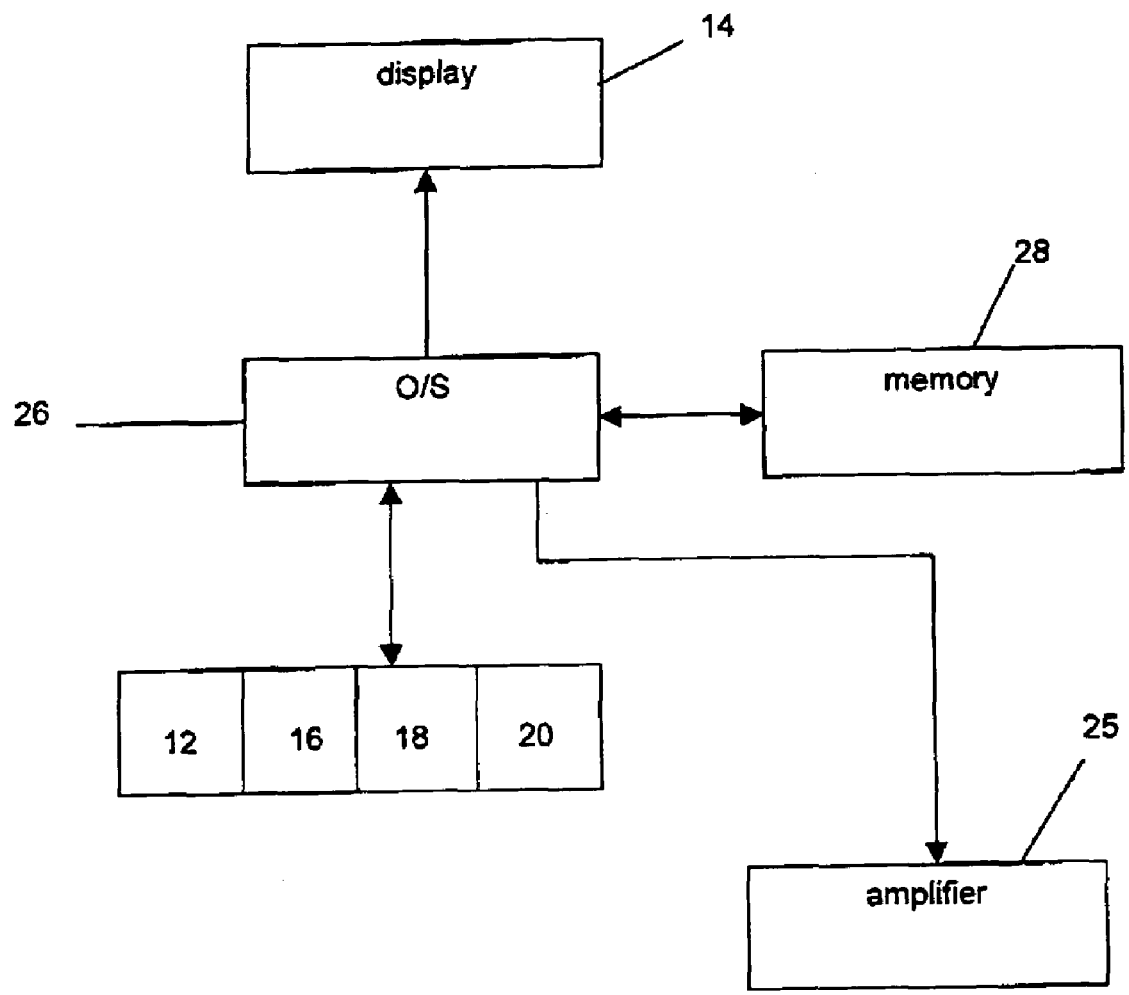
FIG. 5 is an illustration of the system architecture.

In FIG. 5, the display 14 is controlled by a processor 26 having an operating system 27. Memory 28 is preferably a non-volatile memory. The mappable control functions of controls 12, 16, 18 and 20 are also controlled by processor 26. A digital amplifier and audio circuit 25 may also be provided controlled by processor 26.

However, although this permits the user to view the display 14 with the correct orientation, the controls 16, 18 and 20 are still set for right-handed use.

Therefore, and as is shown in FIGS. 5 to 8, the controls 16, 18 and 20 are remapped for left-hand use.

Figure 6:
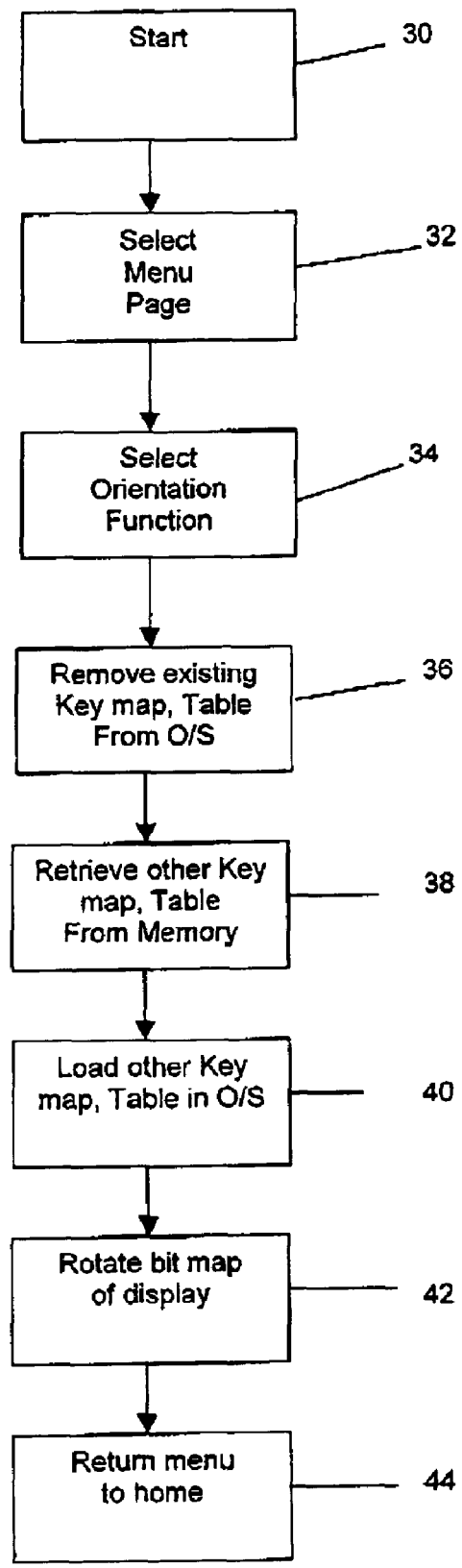
FIG. 6 is an overall flow chart for the process for the change in orientation.

To refer to FIGS. 5 and 6, after starting device 10 in step 30, use of control knob 20 in step 32 enables various menu items to be displayed on display 14, and to be selected using knob 20. Once the correct menu function is selected in step 34 by pressing knob 20, the operating system 27 stops using the key map and table presently in use (step 36). For example, it may be the normal or right hand Key map, Table 1. The operating system 27 in step 38 retrieves the other. Key map, Table from memory 28 and loads it into the operating system 27 in step 40. This may be Key map, Table 2. This converts controls 16, 18 and 20 to the other operation. If previously right handed, they are remapped to left-handed. If left handed, they are remapped to right handed. When remapped to left-handed, the up volume function of button 16 is remapped to be at the lower volume button 18; and the lower volume function of button 18 is remapped to be at the up volume button 16. That is, the functions of buttons 16, 18 are interchanged.

In step 34, a time-out may be incorporated so that if a menu function is not selected within a predetermined time (such as, for example, 5, 10, or 15 seconds) the menu reverts to "home".

For menu control knob 20, its operation is reversed and the functions are interchanged. Therefore, rotation clockwise will move the menu to the right, and rotation anticlockwise will move the menu to the left. This is also sent to the operating system 27 in step 42. The displayed data on display 14 is then rotated 180° for left-handed operation. However, the layout of the display 14 is not changed. Therefore, the location indicator 17 remains "above" the battery level indicator 19 in both orientations. In this way the layout remains the same. The display 14 is rotated as a single entity.

In FIG. 5, the operating system 27 controls the operation of controls 12, 16, 18 and 20. For knob 20, this may be separated into the forwards-and-reverse (left-and-right movement) functions, and the selection function, as the forwards-and-reverse functions are able to be remapped, but the selection function is not.

Figures 7, 8:
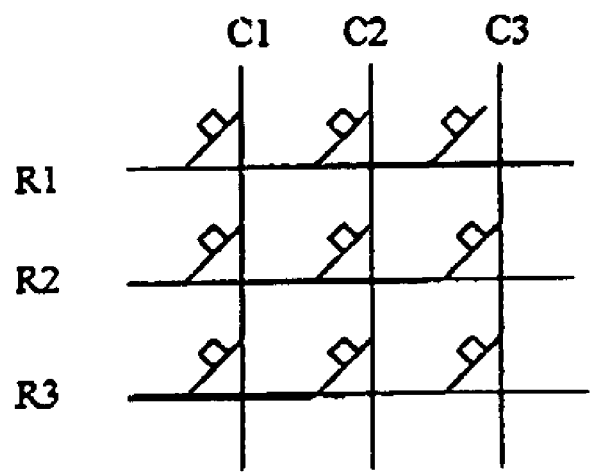
FIG. 7 is a key map for function operation.
FIG. 8 are alternate tables for the key map corresponding to the two orientations.

As shown in FIGS. 7 and 8, the Key map (FIG. 6) has rows and columns for various control functions. When alternate Key map, Table 2 is selected, those control functions are as per Table 2. When Key map, Table 1 is selected the control functions are as per Table 1. Therefore, the control button 16 at $R_2C_1$ (row 2, column 1), has its function changed. Similarly for all other mappable control functions.

In this way a user can, with the press of a few buttons, remap display 14 and controls 16, 18 and 20 from right-hand to left-hand use; and from left-hand to right-hand use.

The rotation of the display 14 may be by any suitable, known means.

Although an MP3 player is shown, the present invention is equally applicable to any portable device with digital functionality.

Whilst there has been described in the foregoing description a preferred embodiment of the present invention, it will be understood by those skilled in the technology concerned that many variations or modifications in details of design, construction or operation may be made without departing from the present invention.

The invention claimed is:

1. A portable digital device comprising:

control devices for controlling operating functions of the portable digital device in response to manual actuation by a user, wherein the control devices include a first button, a second button and a rotatable knob;

a digital display for displaying information to the user; and a processor for rotating the displayed information from a right-hand orientation to a left-hand orientation, and from the left-hand orientation to the right-hand orientation, wherein the right-hand orientation is for right-hand use of the portable digital device by the user, the left-hand orientation is for left-hand use of the portable digital device by the user, the first button provides a first operating function of the portable digital device in the right-hand orientation and a second operating function that is a reverse of the first operating function in the left-hand orientation, the second button provides the second operating function in the right-hand orientation and the first operating function in the left-hand orientation, and the knob provides a third operating function for the portable digital device in the right-hand and left-hand orientations and reverses orientation of the third operating function between the right-hand and left-hand orientations.

2. A portable digital device as claimed in claim 1, wherein the knob is spring loaded to a central position.

3. A portable digital device as claimed in claim 1, wherein the third operating function is forward and reverse track skip.

4. A portable digital device as claimed in claim 1, wherein the third operating function is cursor movement in the displayed information.

5. A portable digital device as claimed in claim 4, wherein the knob is rotatable anticlockwise to move a cursor to the right across a menu page in the displayed information in the right-hand orientation, the knob is rotatable clockwise to move the cursor to the left across the menu page in the right-hand orientation, the knob is rotatable anticlockwise to move the cursor to the left across the menu page in the left-hand orientation, and the knob is rotatable clockwise to move the cursor to the right across the menu page in the left-hand orientation.

6. A portable digital device as claimed in claim 1, wherein the control devices further include a third button that provides pause and playback for the portable digital device in the right-hand and left-hand orientations in the same manner in the right-hand and left-hand orientations.

7. A portable digital device as claimed in claim 1, wherein the rotation between the right-hand and left-hand orientations is 180° and does not change a layout of the displayed information.

8. A portable digital device as claimed in claim 1, wherein the portable digital device is shaped adapted to be gripped by and substantially fit within and operated by a right hand of the user for the right-hand use, and the portable digital device is shaped adapted to be gripped by and substantially fit within and operated by a left hand of the user for the left-hand use.

9. A portable digital device as claimed in claim 1, wherein the portable digital device is shaped for the control devices to be actuated by a single finger within a right hand of the user for the right-hand use, and the portable digital device is shaped for the control devices to be actuated by a single finger within a left hand of the user for the left-hand use.

10. A portable digital device as claimed in claim 1, wherein the portable digital device is an MP3 player.

* * * * *